US010705248B2

(12) United States Patent  
Matsushima et al.

(10) Patent No.: US 10,705,248 B2  
(45) Date of Patent: Jul. 7, 2020

(54) PERIODIC LIGHT PROJECTING SENSOR CONTROL DEVICE AND SENSOR SYSTEM ENSURING MUTUAL INTERFERENCE DOES NOT OCCUR

(71) Applicant: OMRON Corporation, Kyoto (JP)

(72) Inventors: Takuya Matsushima, Ayabe (JP); Koyo Ozaki, Kyoto (JP); Yusuke Iida, Ayabe (JP)

(73) Assignee: OMRON Corporation, Kyoto (JP)

( * ) Notice: Subject to any disclaimer, the term of this patent is extended or adjusted under 35 U.S.C. 154(b) by 107 days.

(21) Appl. No.: 15/818,766

(22) Filed: Nov. 21, 2017

(65) Prior Publication Data

US 2018/0224570 A1    Aug. 9, 2018

(30) Foreign Application Priority Data

Feb. 8, 2017    (JP) .................................. 2017-021583

(51) Int. Cl.  
*G01V 8/20*    (2006.01)

(52) U.S. Cl.  
CPC ..................... *G01V 8/20* (2013.01)

(58) Field of Classification Search  
CPC .. G01V 8/20; G01V 8/10; G01S 17/00; G01S 17/02; G01S 17/06; G01J 1/42  
See application file for complete search history.

(56) References Cited

U.S. PATENT DOCUMENTS

| | | | | |
|---|---|---|---|---|
| 6,411,856 B1* | 6/2002 | Takeuchi | ........... | G05B 19/0421 700/2 |
| 2003/0080284 A1* | 5/2003 | Wake | ........... | G01V 8/20 250/221 |
| 2006/0071154 A1* | 4/2006 | Osako | ........... | G01V 8/20 250/221 |
| 2014/0131555 A1* | 5/2014 | Iida | ........... | G01J 1/4228 250/208.2 |
| 2016/0155306 A1* | 6/2016 | Kawanaka | ........... | F16P 3/142 340/555 |

FOREIGN PATENT DOCUMENTS

| CN | 1417562 | 5/2003 |
|---|---|---|
| CN | 1519784 | 8/2004 |

(Continued)

OTHER PUBLICATIONS

"Office Action of China Counterpart Application," with English translation thereof, dated Nov. 28, 2019, p. 1-p. 17.

*Primary Examiner* — Que Tan Le  
*Assistant Examiner* — Jennifer D Bennett  
(74) *Attorney, Agent, or Firm* — JCIPRNET

(57) ABSTRACT

A sensor control device and a sensor system are provided through which it is possible to automatically detect whether mutual interference occurs for a plurality of sensor units, and it is possible to automatically set periodic light projection timings for preventing mutual interference. A sensor control device includes a light projection control part configured to instruct a light projection operation for each of a plurality of sensor units and a light projection timing setting part configured to set periodic light projection timings when each of the sensor units is periodically operated based on results of light projection control for each of the sensor units and detection results of each of the sensor units.

7 Claims, 12 Drawing Sheets

(56) References Cited

FOREIGN PATENT DOCUMENTS

| CN | 1756078 | 4/2006 |
| CN | 102105817 | 6/2011 |
| CN | 104062690 | 9/2014 |
| CN | 104914480 | 9/2015 |
| CN | 105371094 | 3/2016 |
| JP | 2014-096697 | 5/2014 |

* cited by examiner

PERIODIC LIGHT PROJECTING SENSOR CONTROL DEVICE AND SENSOR SYSTEM ENSURING MUTUAL INTERFERENCE DOES NOT OCCUR

CROSS-REFERENCE TO RELATED APPLICATION

This application claims the priority benefits of Japan Patent Application No. 2017-021583, filed on Feb. 8, 2017. The entirety of the above-mentioned patent application is hereby incorporated by reference herein and made a part of this specification.

BACKGROUND

Technical Field

The disclosure relates to a sensor control device configured to control a plurality of sensor units and a sensor system including the sensor control device, and particularly, to a sensor control device configured to prevent mutual interference between a plurality of sensor units and a sensor system.

Description of Related Art

A sensor system configured to determine whether a workpiece (object to be detected) is present based on detection values (amounts of light received) in photoelectric sensors using a plurality of photoelectric sensors is known as a conventional technique. Further, a sensor system configured to prevent mutual interference caused when light projected from a specific photoelectric sensor enters another photoelectric sensor is known as a conventional technique. For example, Japanese Unexamined Patent Application Publication No. 2014-096697 discloses a sensor system in which a plurality of sensor units storing respective pieces of identification information are operated after a delay time determined according to respective pieces of identification information has elapsed using a synchronization signal transmitted at predetermined periods as a starting point and thus mutual interference is prevented.

However, in the related art described above, there is an upper limit on the number of sensor units between which mutual interference can be prevented depending on the relationship between a predetermined period and a delay time. Therefore, when a number of sensor units exceeding the upper limit is used, there is a problem of mutual interference. In addition, a light projection order of sensor units is set according to a connection order of the plurality of sensor units, and a degree of influence of mutual interference is not considered. Further, the entire light projection period of the sensor units is a fixed value set based on an upper limit value of the number of sensor units between which mutual interference can be prevented and a delay time. Therefore, when the number of sensor units used is less than an upper limit value, there is a problem of an unnecessary waiting time being generated.

SUMMARY

A sensor control device according to an aspect of the disclosure includes a light projection control part configured to instruct a light projection operation performed by a light projection part for each of a plurality of sensor units including the light projection part and a light reception part; and a light projection timing setting part configured to set periodic light projection timings when each of the sensor units is periodically operated based on results of light projection control performed by the light projection control parts with respect to each of the sensor units and detection results obtained by the light reception part of each of the sensor units.

A sensor system according to an aspect of the disclosure includes a plurality of sensor units including a light projection part and a light reception part and the sensor control device according to the above aspect of the disclosure.

BRIEF DESCRIPTION OF THE DRAWINGS

FIGS. 3(a) and 3(b) are schematic diagrams of a sensor unit according to Embodiment 1 of the disclosure, in which FIG. 3(a) is a perspective view of a sensor unit, and FIG. 3(b) is a schematic diagram showing a state in which sensor units are connected in series.

DESCRIPTION OF THE EMBODIMENTS

Figure 1:
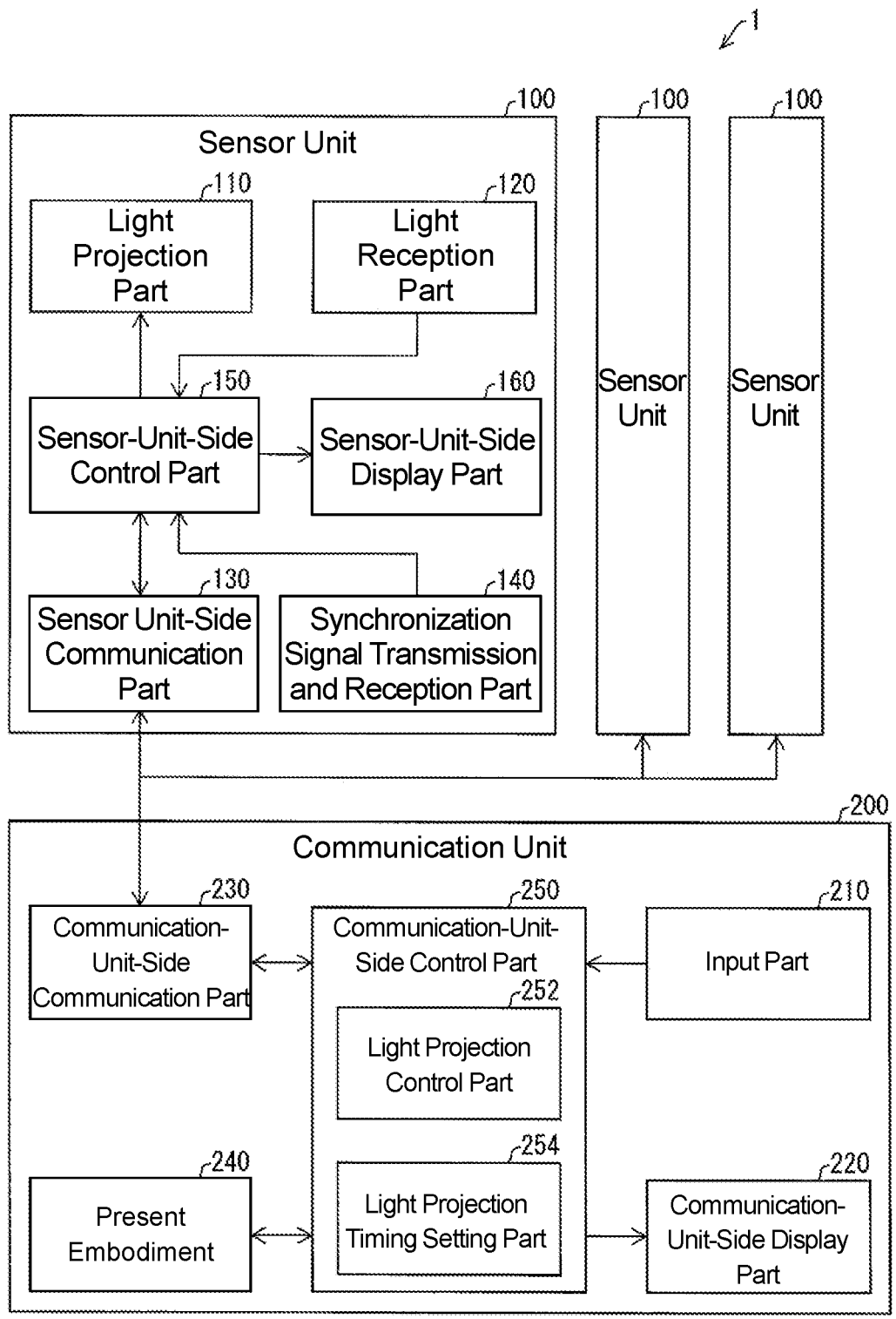
FIG. 1 is a block diagram showing an example of a configuration of a main part of a sensor system according to Embodiment 1 of the disclosure.

The disclosure provides a sensor control device and a sensor system through which it is possible to automatically detect whether mutual interference occurs between a plurality of sensor units, and it is possible to automatically set periodic light projection timings for preventing mutual interference.

In one embodiment, a sensor control device includes a light projection control part configured to instruct a light projection operation performed by a light projection part for each of a plurality of sensor units including the light projection part and a light reception part; and a light projection timing setting part configured to set periodic light projection timings when each of the sensor units is periodically operated based on results of light projection control performed by the light projection control parts with respect to each of the sensor units and detection results obtained by the light reception part of each of the sensor units.

According to the above configuration, it is possible to set periodic light projection timings based on light projection control results and detection results for the plurality of sensor units. Therefore, for example, it is possible to set light projection timings for the plurality of sensor units by the way that light projection timings do not overlap. Thus, it is possible to provide a sensor control device that automatically sets appropriate light projection timings for the plurality of sensor units.

In the sensor control device according to the embodiment, the light projection timing setting part determines whether mutual interference caused when light projected from a certain sensor unit is received by another sensor unit occurs, and sets the periodic light projection timings by the way that mutual interference does not occur.

According to the above configuration, it is possible to set periodic light projection timings by the way that mutual interference does not occur between the light projection sensor units and the light receiving sensor units included in the plurality of sensor units. Therefore, it is possible to prevent an influence of mutual interference during detection of whether a workpiece is present.

In the sensor control device according to the embodiment, the light projection control part detects the number of the plurality of sensor units, and the light projection timing setting part sets the periodic light projection timings corresponding to the number in a range in which mutual interference does not occur.

According to the above configuration, it is possible to prevent mutual interference and it is possible for the plurality of sensor units to project light at periodic light projection timings corresponding to the number of sensor units. Therefore, for example, when the number of sensor units is large, it is possible to set periodic light projection timings by the way that the entire light projection period is minimized. On the other hand, when the number of sensor units is small, periodic light projection timings can be set by the way that the entire light projection period of the sensors becomes longer in a range in which the user does not feel uncomfortable. Therefore, it is possible to set appropriate periodic light projection timings according to the number of sensor units.

In the sensor control device according to the embodiment, the light projection control part arbitrarily sets the entire light projection period of the plurality of sensor units in the range in which mutual interference does not occur.

According to the above configuration, it is possible to arbitrarily set light projection periods in the range in which mutual interference does not occur. Therefore, for example, the shortest light projection period can be set in the range in which mutual interference does not occur in order to improve a response speed of the sensor system.

In the sensor control device according to the embodiment, the light projection timing setting part sets the periodic light projection timing based on the situation of the sensor unit when mutual interference occurs.

According to the above configuration, the light projection timing setting part can set a delay time as an appropriate value corresponding to the situation rather than a fixed value. Therefore, for example, it is possible to set a delay time of the sensor unit that has received an excessive light intensity when mutual interference occurs to be large, and it is possible to prevent mutual interference more efficiently.

In the sensor control device according to the embodiment, the plurality of sensor units include sensor units of a plurality of types, and the periodic light projection timing set for each of the sensor units may be set based on at least a type of the sensor unit.

According to the above configuration, it is possible to set appropriate periodic light projection timings according to characteristics of each sensor unit. Therefore, for example, different periodic light projection timings can be set for a sensor unit for which mutual interference can be prevented by merely setting slightly different light projection timings and a sensor unit for which mutual interference cannot be prevented unless the light projection timing is significantly different.

The sensor control device according to the embodiment includes a communication-unit-side control part that functions as a communication unit that is communicatively connected to the plurality of sensor units and performs an operation instruction for each of the sensor units.

According to the above configuration, the plurality of sensor units can be controlled by an operation instruction from the communication unit. Therefore, for example, periodic light projection timings set for the sensor unit are stored in the communication unit, and the sensor units can perform light projection at periodic light projection timings based on an operation instruction from the communication unit. Therefore, it is possible to realize sensor units with a simple configuration.

In one embodiment, a sensor system includes a plurality of sensor units including a light projection part and a light reception part and the sensor control device according to the above embodiments.

According to the above configuration, the same operations and effects as in the sensor control device according to the above embodiment are obtained.

According to one embodiment, it is possible to provide a sensor control device that automatically sets appropriate light projection timings for a plurality of sensor units.

Embodiment 1

Embodiment 1 of the disclosure will be described with reference to FIGS. 1 to 10.

(Configuration of Sensor System)

A configuration of the sensor system 1 according to Embodiment 1 will be described with reference to FIGS. 1 to 4. FIG. 1 is a block diagram showing an example of a configuration of a main part of the sensor system 1 according to the present embodiment. Here, in the following description, an example in which a communication unit 200 serves as a sensor control device will be described. However, a specific sensor unit 100 may serve as a sensor control device or an external control device such as a programmable logic controller (PLC) may serve as a sensor control device.

Figure 2:
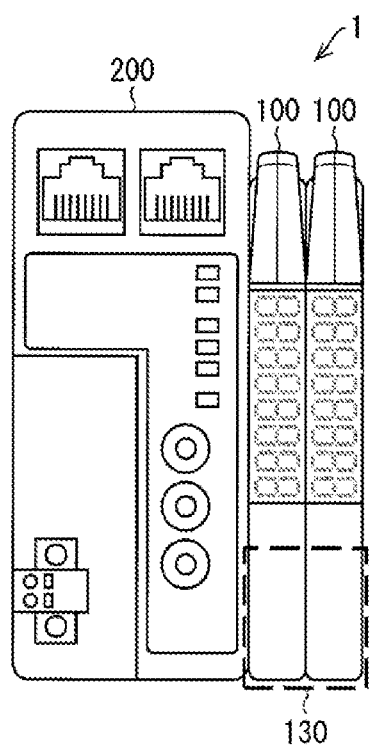
FIG. 2 is a schematic diagram of an overview of the sensor system according to Embodiment 1 of the disclosure.

The sensor system 1 includes a plurality of sensor units 100 and the communication unit 200. An appearance of the sensor system 1 is shown in FIG. 2. FIG. 2 is a schematic diagram of an overview of the sensor system 1 according to the present embodiment. In the shown example, in the sensor system 1, two sensor units 100 are serially connected to the side of the communication unit 200. In this case, the sensor unit 100 is connected to the communication unit 200 by a sensor-unit-side communication part 130 to be described below. Here the sensor system 1 shown in FIG. 2 is an example, and the form and the like of the sensor system 1 are not limited.

The sensor system 1 is a system configured to detect whether a workpiece (object to be detected) is present based on amounts of light received by the sensor units 100 with respect to light projected from the sensor units 100 according to set periodic light projection timings in the plurality of sensor units 100. Here, the periodic light projection timing is a timing at which a sensor unit 100 is operated, and each of the sensor units 100 periodically operates according to the periodic light projection timings. The sensor system 1 can set the periodic light projection timings by the way that mutual interference that occurs when light projected by a certain sensor unit 100 among the plurality of sensor units 100 is received by another sensor unit 100 does not occur. Here, while the number of sensor units 100 is not limited, in order to accurately detect whether mutual interference occurs, preferably, the entire light projection period of the plurality of sensor units 100 is set to be about 1 ms and the number of sensor units 100 is set to about 30.

Figure 3A:
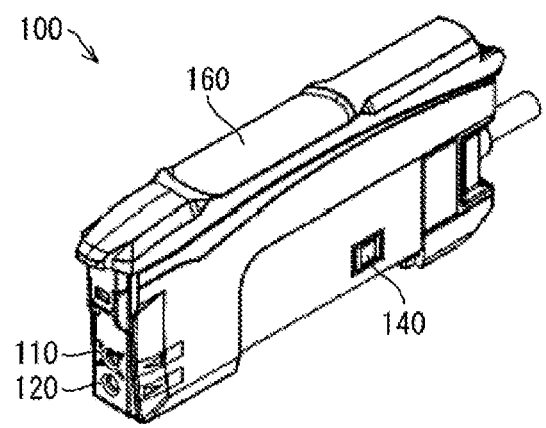
Figure 3B:
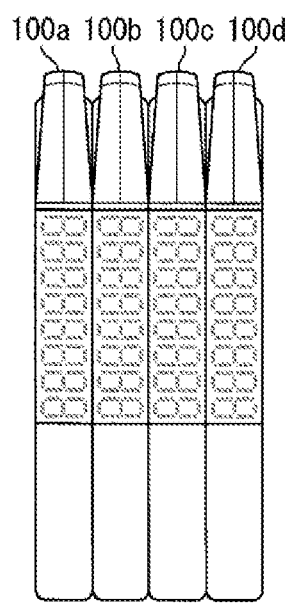

The sensor unit 100 is a sensor that is communicatively connected to the communication unit 200, and performs light projection and light reception. For example, the sensor unit 100 may be a photoelectric sensor. An appearance of the sensor unit 100 is shown in FIGS. 3(a) and 3(b). FIGS. 3(a) and 3(b) are schematic diagrams of an overview of the sensor unit 100 according to the present embodiment. In the shown example, FIG. 3(a) is a perspective view of a single sensor unit 100, and FIG. 3(b) is a schematic diagram showing a state in which four sensor units 100a to 100d are connected in series. Here, in the following description, when a plurality of sensor units 100 are connected in series, the sensor unit 100 on the leftmost side is defined as the first sensor unit 100, and the second and subsequent sensor units 100 are defined in order from left to right. That is, in FIG. 3(b), the sensor unit 100a is the first sensor unit 100, and the sensor unit 100d corresponds to the fourth sensor unit 100. In addition, the sensor unit 100 shown in FIGS. 3(a) and 3(b) are examples, and the sensor unit 100 may have any form and the positional relationship between parts is arbitrary as long as it has a configuration to be described below.

The sensor unit 100 includes a light projection part 110, a light reception part 120, a sensor-unit-side communication part 130, a synchronization signal transmission and reception part 140, a sensor-unit-side control part 150, and a sensor-unit-side display part 160.

The light projection part 110 projects light under control of the sensor-unit-side control part 150. Light projected by the light projection part 110 can be projected from a light projection head (not shown) to a workpiece through an optical fiber (not shown).

The light reception part 120 can receive light from the outside including light projected by the light projection part 110. The light reception part 120 may have a configuration in which an amount of light received changes according to whether a workpiece is present. For example, when a workpiece is present, the light reception part 120 may receive reflected light reflected at the workpiece, and when no workpiece is present, the light reception part 120 may receive transmitted light that has passed through a light projection position. Further, the light reception part 120 can receive light received by a light receiving head (not shown) through an optical fiber that is optically connected to the light receiving head. Here, the light receiving head may be formed integrally with the light projection head or may be formed as a separate body.

The sensor-unit-side communication part 130 communicates with the communication unit 200 under control of the sensor-unit-side control part 150 or the communication unit 200. For example, the sensor-unit-side communication part 130 may transmit a control signal received from the communication unit 200 to the sensor-unit-side control part 150. The sensor-unit-side communication part 130 may transmit data and so on regarding an amount of light received in the light reception part 120 received from the sensor-unit-side control part 150 to the communication unit 200. The sensor-unit-side communication part 130 may have any configuration as long as it can communicate with the communication unit 200. For example, the sensor-unit-side communication part 130 may be configured to transmit and receive a control signal regarding hardware through parallel communication and transmit and receive application setting information through serial communication. Alternatively, only one of these may be included in the configuration.

The synchronization signal transmission and reception part 140 transmits and receives a synchronization signal for synchronizing all of the sensor units 100 mounted in the sensor system 1 under control of the sensor-unit-side control part 150. According to the synchronization signal transmitted and received from by the synchronization signal transmission and reception part 140, the plurality of sensor units 100 can be synchronized. Here, the synchronization signal may have any form as long as it can be transmitted and received between the sensor units 100. For example, the synchronization signal may be a synchronization pulse with pulse waves. Further, the synchronization signal may be an optical signal transmitted and received through optical communication, or may be an electrical signal in electrical information transmitted and received through electrical communication such as serial communication.

The sensor-unit-side control part 150 controls parts of the sensor unit 100 in an integrated manner. The sensor-unit-side control part 150 may receive a control signal received from the communication unit 200 through the sensor-unit-side communication part 130 and operate parts. The sensor-unit-side control part 150 may transmit the results obtained by operating the parts to the communication unit 200 through the sensor-unit-side communication part 130.

The sensor-unit-side display part 160 displays various types of information under control of the sensor-unit-side control part 150. For example, the sensor-unit-side display part 160 may be a display that numerically displays an amount of light received by the light reception part 120.

Figure 4:
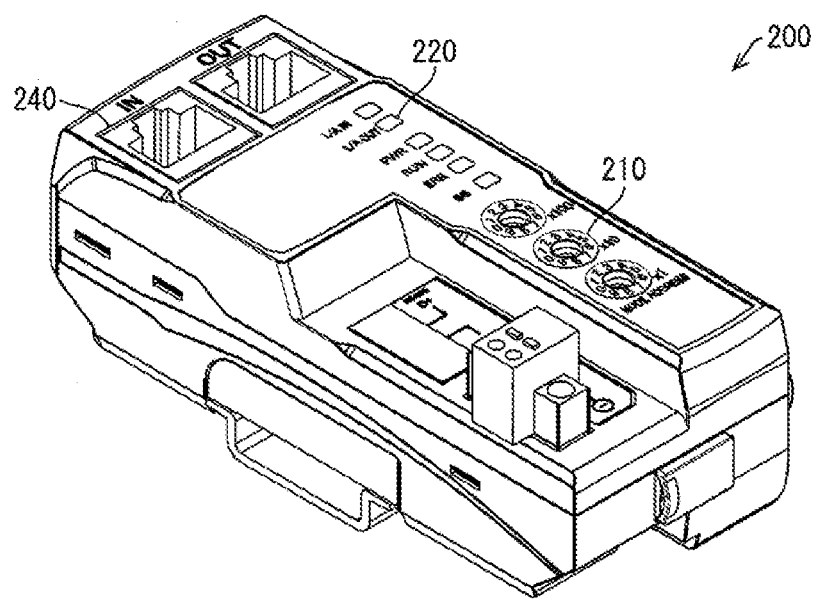
FIG. 4 is a schematic diagram showing an overview of a communication unit according to Embodiment 1 of the disclosure.

The communication unit 200 is communicatively connected to the plurality of sensor units 100, and serves as a sensor control device configured to detect whether a workpiece is present by controlling the plurality of sensor units 100. An appearance of the communication unit 200 is shown in FIG. 4. FIG. 4 is a schematic diagram showing an overview of the communication unit 200 according to the present embodiment.

Here, the communication unit 200 shown in FIG. 4 is an example, and the form of the communication unit 200 and the positional relationship between parts are not limited as long as they have a configuration to be described below.

The communication unit 200 includes an input part 210, a communication-unit-side display part 220, a communication-unit-side communication part, a communication part 240 for an external device, and a communication-unit-side control part 250. In addition, the communication-unit-side control part 250 includes a light projection control part 252 and a light projection timing setting part 254.

Upon the reception of an input from a user, the input part 210 can transmit input details to the communication-unit-side control part 250. According to the example in FIG. 4, the input part 210 may be a rotary switch for setting an exchange number assigned to the communication unit 200. The input part 210 may have any configuration in which an input is received from the user, and may have a configuration including, for example, a button for inputting setting details to the sensor unit 100.

The communication-unit-side display part 220 displays information about the communication unit 200 itself. According to the example in FIG. 4, the communication-unit-side display part 220 may be a state display lamp for notifying the user of various states of the communication unit 200.

The communication part 240 for an external device is for the communication unit 200 to communicate with an external device. According to the example in FIG. 4, the communication part 240 for an external device may include a connector and a network interface card (NIC) for wired connection to an external device via the connector.

The communication-unit-side control part 250 controls parts of the communication unit 200 in an integrated manner. The communication-unit-side control part 250 may control operations of the sensor unit 100 through a communication-unit-side communication part 230. Here, since the plurality of sensor units 100 are connected to the communication unit 200, operations may be individually controlled for each of the sensor units 100 and may be collectively controlled for all of the sensor units 100.

The light projection control part 252 can control a light projection operation performed by the light projection part 110 for each of the plurality of sensor units 100 connected to the communication unit 200. The light projection control part 252 can transmit the results of its own light projection control to the light projection timing setting part 254. The light projection control results are information and so on about a light projection timing at which sensor unit 100 among the plurality of sensor units 100 has actually projected light.

The light projection timing setting part 254 can receive the light projection control results from the light projection control part 252. The light projection timing setting part 254 can receive the detection results from each of the plurality of sensor units 100 through the communication-unit-side communication part 230. The detection results are results information and so on about a sensor unit 100 including the light reception part 120 that has actually received light among the plurality of sensor units. Further, the light projection timing setting part 254 can set periodic light projection timings based on the light projection control results and the detection results. For example, the light projection timing setting part 254 may set different delay times for each of the sensor units 100 by the way that mutual interference between the sensor units 100 does not occur, thereby setting different periodic light projection timings.

(Detection of Mutually Interfering Sensor Units)

Figures 5A, 5B:
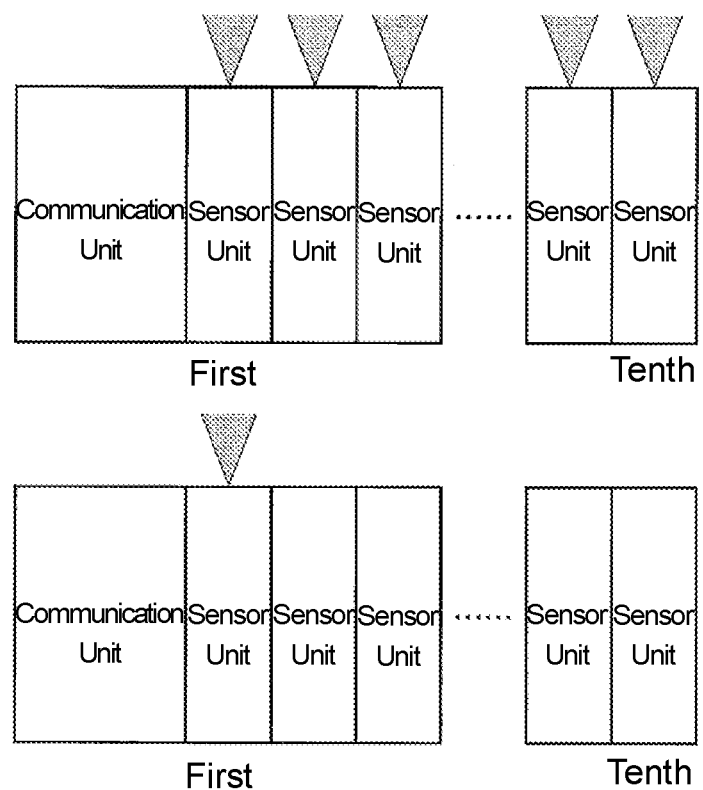
FIGS. 5(a) and 5(b) are schematic diagrams showing an overview of an operation of automatically detecting mutual interference between serially connected sensor units in the sensor unit according to Embodiment 1 of the disclosure.

In the present embodiment, a series of operations for detecting mutually interfering sensor units, which are performed by the light projection control part 252 and the light projection timing setting part 254, will be described with reference to FIGS. 5(a) and 5(b). FIGS. 5(a) and 5(b) are schematic diagrams showing an overview of an operation of automatically detecting mutual interference between connected sensor units 100 in the sensor system 1 according to the present embodiment.

FIG. 5(a) shows a state in which, in the sensor system 1 in which ten sensor units 100 are serially connected to one communication unit 200, light projections in the sensor units 100 are controlled. In the shown example, the communication unit 200 is disposed on the left side in the drawing and on the right side thereof, ten sensor units 100 are connected in series in order from the left as first to tenth units.

The upper drawing shows a state in which light projection from the light projection part 110 is performed in all of the first to tenth sensor units 100. On the other hand, the lower drawing shows a state in which light projection from the light projection part 110 is performed only in the first sensor unit 100. When only specific sensor unit 100 performs light projection, if an amount of light received exceeding a predetermined threshold value is detected in sensor units 100 other than this sensor unit 100, the sensor system 1 determines that mutual interference occurs. That is, when a certain sensor unit 100 and another sensor unit 100 perform light projection at the same periodic light projection timing, since an amount of light received exceeding a predetermined threshold value is detected regardless of light projection from the other sensor unit 100, this is not suitable for detecting whether a workpiece is present.

FIG. 5(b) is a table of summarized combinations in which mutual interference actually occurs in the configuration of the sensor system 1 shown in FIG. 5(a). In the shown example, "E (light projection sensor unit number)" and "R (light receiving sensor unit number)" indicate ordinal numbers of the sensor units 100 for the sensor unit 100 which has projected light and another sensor unit 100 which has detected an amount of light received exceeding a predetermined threshold value. In addition, in the table, "x" indicates that mutual interference occurs in the combination.

For example, first row data shows that, when only the first sensor unit 100 projects light, mutual interference occurs in the tenth sensor unit 100. Similarly, second row data shows that, when only the second sensor unit 100 projects light, mutual interference occurs in the seventh sensor unit 100.

In the present embodiment, the sensor system 1 can prevent mutual interference by setting different periodic light projection timings for sensor units 100 in a combination of sensor units 100 between which mutual interference occurs.

(Flow of Mutually Interfering Sensor Units Detection Process)

Figure 6:
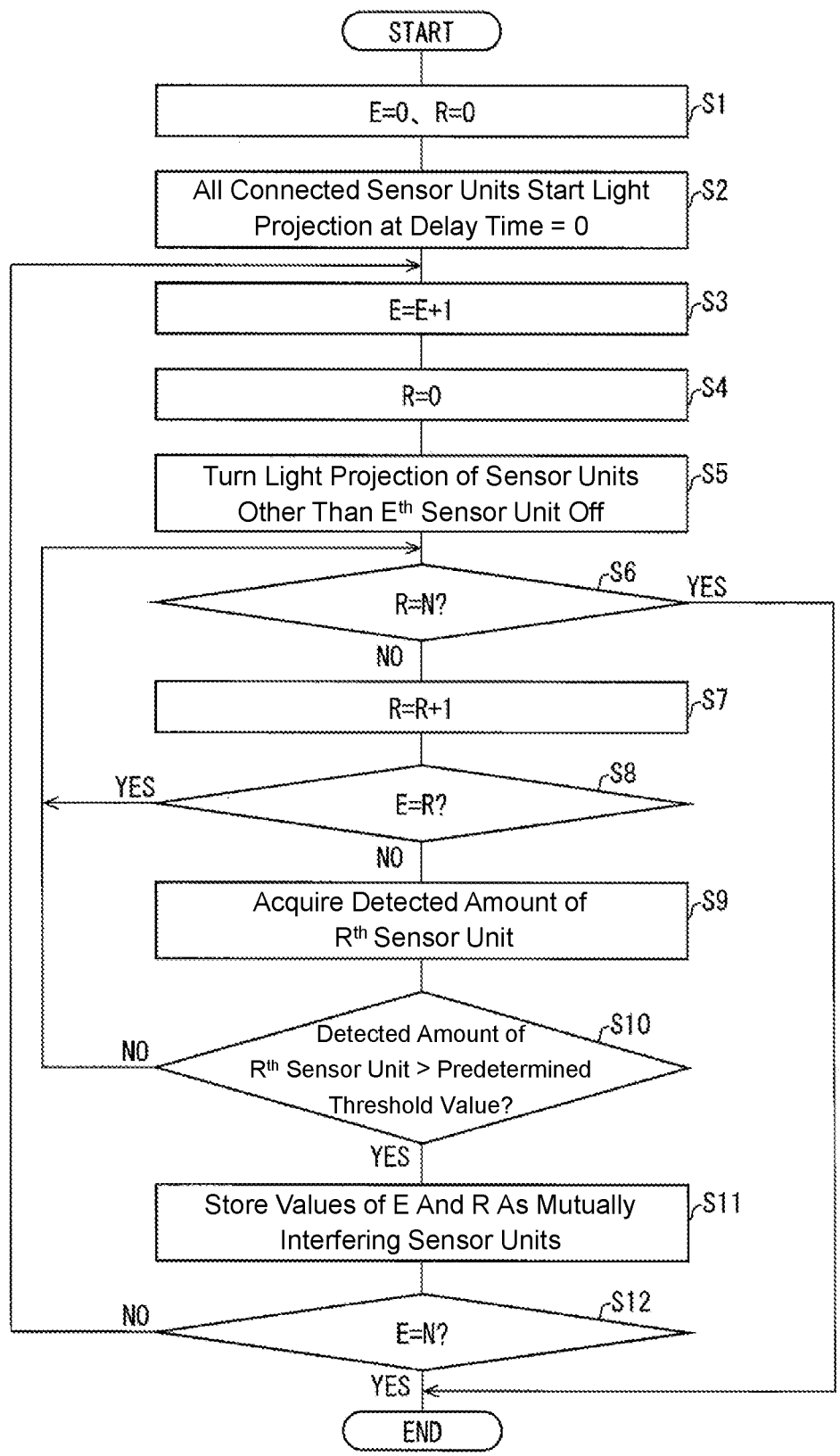
FIG. 6 is a flowchart showing an example of a mutually interfering sensor units detection process performed by a light projection control part and a light projection timing setting part according to Embodiment 1 of the disclosure.

A flow of a mutually interfering sensor units detection process performed by the light projection control part 252 and the light projection timing setting part 254 according to the present embodiment will be described with reference to FIG. 6. FIG. 6 is a flowchart showing an example of a mutually interfering sensor units detection process performed by the light projection control part 252 and the light projection timing setting part 254 according to the present embodiment. Here, in the flowchart, E represents a light projection sensor unit number, R represents a light receiving sensor unit number, and N represents the number of sensor units 100.

First, the light projection control part 252 sets E=0, and R=0 as initial values (S1). Then, the light projection control part 252 performs control such that all of the sensor units 100 serially connected to the communication unit 200 start light projection with a delay time=0 and all of the sensor units 100 perform light projection at the same time (S2).

Next, the light projection control part 252 increases the value of E in increments of 1 (E=E+1) (S3), and additionally sets R=0 (S4), and then performs control such that sensor units 100 other than the $E^{th}$ sensor unit 100 stop light projection (S5). Therefore, only the $E^{th}$ sensor unit 100 is in a state in which light projection is performed. Then, when it is determined whether R is equal to N, the light projection control part 252 determines whether determination of mutual interference in the $N^{th}$ sensor unit 100 with respect to light projection from the $E^{th}$ sensor unit 100 is completed (S6). When R is not equal to N (NO in S6), that is, when it is determined that determination of mutual interference in the $N^{th}$ sensor unit 100 is not completed, the light projection control part 252 increases the value of R in increments of 1 (R=R+1) (S7), and then determines whether E is equal to R (S8). On the other hand, when it is determined in S6 that R is equal to N (YES in S6), the light projection control part 252 determines that determination of mutual interference in all combinations of E and R is completed, and the series of processes end.

In S8, when it is determined that E is not equal to R (NO in S8), the light projection timing setting part 254 acquires an amount detected by the light reception part 120 with respect to light projection from the $E^{th}$ sensor unit 100 in the $R^{th}$ sensor unit 100 (S9). On the other hand, when it is determined that E is equal to R (YES in S8), if the sensor unit 100 receives light projected from the sensor unit 100 itself, the light projection control part 252 determines that the sensor unit 100 is not a target for determination of whether mutual interference occurs. Then, the process advances to S6.

After S9, the light projection timing setting part 254 determines whether an amount detected by the light reception part 120 of the $R^{th}$ sensor unit 100 is greater than a predetermined threshold value (S10). When it is determined that an amount detected by the light reception part 120 of the $R^{th}$ sensor unit 100 is greater than a predetermined threshold value (YES in S10), the light projection timing setting part 254 assumes the $E^{th}$ sensor unit 100 and the $R^{th}$ sensor unit 100 as mutually interfering sensor units between which mutual interference occurs, and values of E and R at this time are stored (S11). On the other hand, when it is determined in S10 that an amount detected by the light reception part 120 of the $R^{th}$ sensor unit 100 is equal to or less than a predetermined threshold value (NO in S10), the light projection timing setting part 254 determines that mutual interference did not occur between the $E^{th}$ sensor unit 100 and the $R^{th}$ sensor unit 100. Then, the process advances to S6.

After S11, the light projection timing setting part 254 determines whether E is equal to N, and thus determines whether the process up to determination of whether mutual interference occurs when only the $N^{th}$ sensor unit 100 projects light is completed (S12). When E is not equal to N (NO in S12), the process advances to S3, and the processes of S3 to S12 are repeated. On the other hand, when E is equal to N (YES in S12), the light projection timing setting part 254 determines that determination of whether mutual interference occurs in all combinations of E and R is completed, and the series of processes end.

According to the above process, the light projection control part 252 and the light projection timing setting part 254 can acquire results of light projection control for N sensor units 100 and detection results of the light reception part 120, and store combinations of the sensor units 100 between which mutual interference occurs. Here, the combinations of the sensor units 100 between which mutual interference occurs can be shown in, for example, a tabular form in FIG. 5(b).

(Setting of Delay Time for Periodic Light Projection Timings)

Figure 7D:
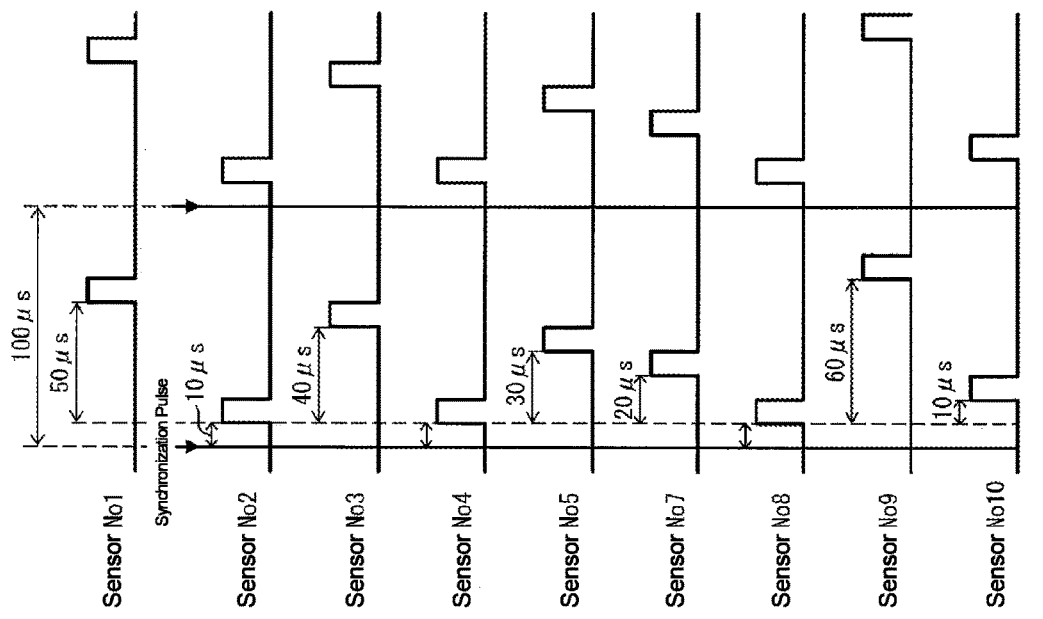
FIGS. 7(a) to 7(d) are schematic diagrams showing an overview of an operation of setting a delay time based on mutual interference detection results in the sensor system according to Embodiment 1 of the disclosure.
Figure 7A:
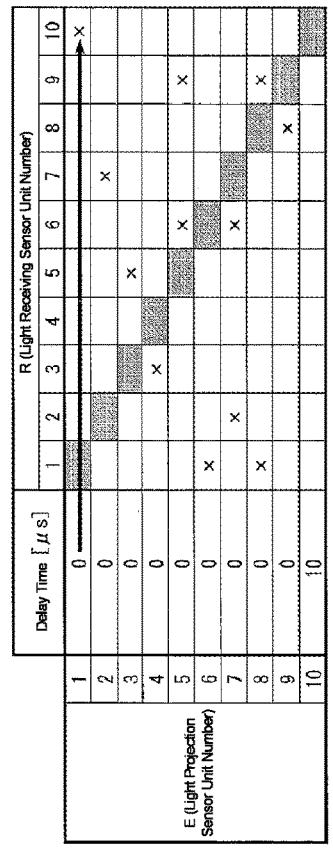
Figure 7B:
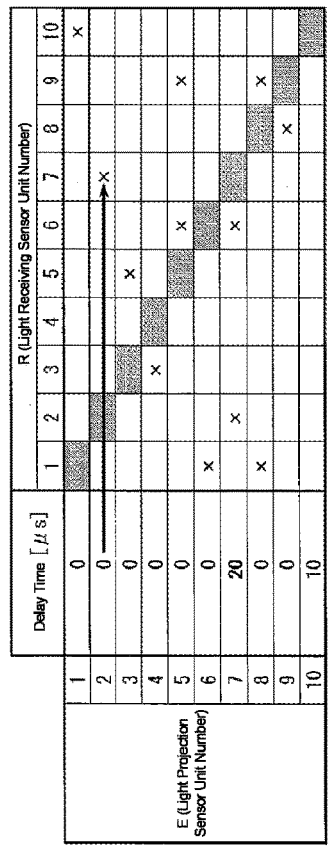
Figure 7C:
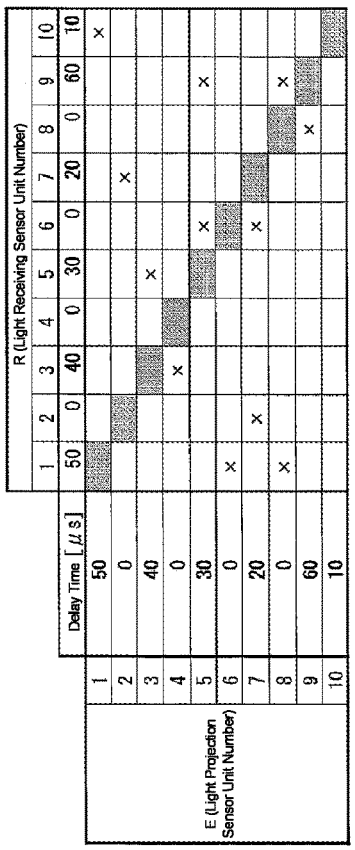

In the present embodiment, a method of setting a delay time for periodic light projection timings through which the light projection timing setting part 254 sets different periodic light projection timings for each of the plurality of sensor units 100 will be described with reference to FIGS. 7(a) to 7(d). FIGS. 7(a) to 7(d) are schematic diagrams showing an overview of an operation of setting a delay time based on mutual interference detection results in the sensor system 1 according to the present embodiment. FIGS. 7(a) to 7(c) show specific examples in which a mutually interfering sensor units detection process is performed in the sensor system 1 to which ten sensor units 100 are connected in series, based on a combination table of the sensor units 100 between which mutual interference occurs stored in the light projection control part 252, delay times are set for periodic light projection timings of the sensor units 100. FIG. 7(d) is a schematic diagram showing an operation of the sensor units 100 that project light at periodic light projection timings to which the delay times set in FIG. 7(c) are applied.

Here, in FIGS. 7(a) to 7(c), definitions of items indicate the same details as in items with the same names in FIG. 5(b) except "delay time (μs)." In addition, "delay time (μs)" represents a delay time set for a periodic light projection timing in the sensor units 100. In the shown example, when light projection is instructed, the sensor units 100 perform light projection for 10 μs, and a delay time is set in units of 10 μs. In addition, the entire light projection period of the sensor units 100 is 100 μs.

FIG. 7(a) shows states in which, after delay times are set based on determination of whether mutual interference occurs for the first row record in E=1, delay times are set based on determination of whether mutual interference occurs for the second row record in E=2. Here, since that fact that mutual interference occurs when the set of (E, R) is (1, 10) is shown in the first row record, a delay time of 10 μs is set for a periodic light projection timing of the tenth sensor unit 100 which is a light receiving sensor unit. Then, since the fact that mutual interference occurs when the set of (E, R) is (2, 7) is shown in the second row record, it is necessary to set a delay time for the seventh sensor unit 100. In this case, since a delay time of 10 μs is set for the tenth sensor unit 100 based on the first row record, a delay time of 20 μs is set for the seventh sensor unit 100 so that light projection is not performed simultaneously with the tenth sensor unit 100.

FIG. 7(b) shows states in which, after FIG. 7(a), delay times are set based on determination of whether mutual interference occurs for the third row record. In the shown example, in the third row record, since the fact that mutual interference occurs when the set of (E, R) is (3, 5) is shown, it is necessary to set a delay time for the fifth sensor unit 100. Here, delay times of 10 μs and 20 μs are set for the tenth sensor unit 100 and the seventh sensor unit 100, respectively, based on the first row record and the second row record. Thus, a delay time of 30 μs is set for the fifth sensor unit 100 so that overlapping does not occur.

FIG. 7(c) shows a state in which, according to the setting method described in FIGS. 7(a) and 7(b), all records up to the tenth row record are evaluated, and settings of delay times based on determination of whether mutual interference occurs are completed for the ten sensor units 100. In the shown example, definitions of items are the same as those in FIGS. 7(a) and 7(b) except that an item of "delay time (μs)" is set on the side of "R (light receiving sensor unit number)." In this manner, delay times can be set so that periodic light projection timings of the ten sensor units 100 do not overlap. According to the example in the drawing, delay times can be set by the way that, when a delay time for a periodic light projection timing is 0 μs, the second, fourth, sixth, and eighth sensor units 100 perform light projection at the same time, and 60 μs later, the ninth sensor unit 100 performs light projection.

FIG. 7(d) shows waveform diagrams showing waveforms obtained when the ten sensor units 100 perform light projection at periodic light projection timings for which delay times are set based on FIG. 7(c). In the shown example, "sensor No 1" to "sensor No 10" correspond to the first to tenth sensor units 100. In addition, it is assumed that the ten sensor units 100 start light projection after 10 μs of synchronization according to a synchronization pulse is performed using the synchronization signal transmission and reception part 140. Further, light projection in each of the sensor units 100 is expressed in the form of a pulse wave in which light projection continues for 10 μs with a constant light intensity.

For example, after 10 μs from synchronization according to a synchronization pulse, light projection is performed for 10 μs in the second, fourth, sixth, and eighth sensor units 100 in which a value of "delay time (μs)" is 0 in FIG. 7(c). Next, after 20 μs from synchronization, when light projection in the second, fourth, sixth, and eighth sensor units 100 is completed, light projection is performed in the tenth sensor unit 100 in which a value of "delay time (μs)" is 10 at the same time. In this manner, after 70 μs from synchronization, light projection is performed from in ninth sensor unit 100 in which a value of "delay time (μs)" is 60. Then, after 100 μs of synchronization according to a previous synchronization pulse, synchronization is newly performed, and light projection from the ten sensor units 100 starts.

According to the above method, the light projection timing setting part 254 can set delay times for setting different periodic light projection timings for each of the sensor units 100 based on a combination table of the sensor units 100 between which mutual interference occurs.

(Flow of Delay Time Setting Process)

Figure 8:
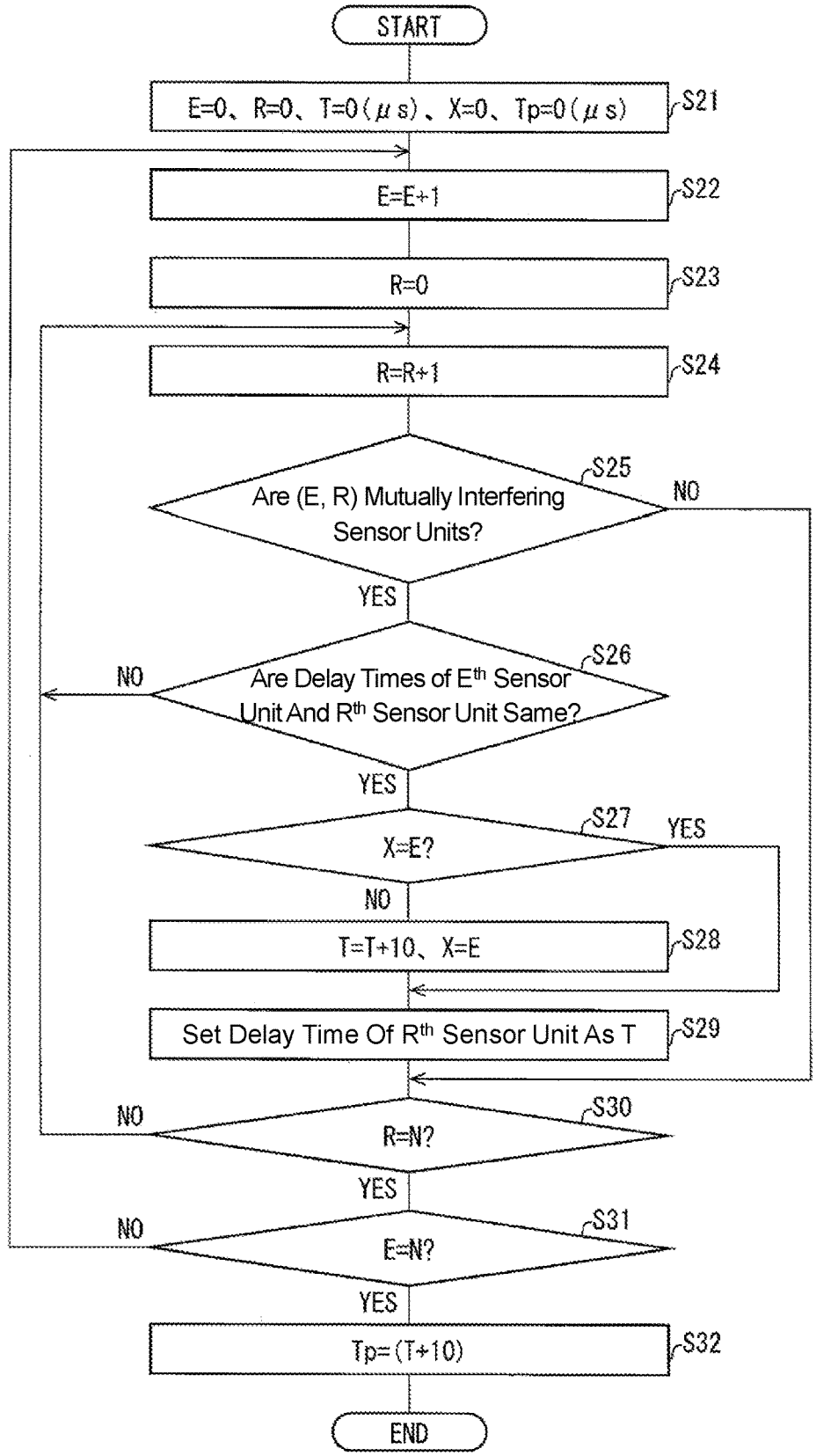
FIG. 8 is a flowchart showing an example of a delay time setting process performed by a light projection timing setting part according to Embodiment 1 of the disclosure.

A flow of a delay time setting process performed by the light projection timing setting part 254 according to the present embodiment will be described with reference to FIG. 8. FIG. 8 is a flowchart showing an example of a delay time setting process performed by the light projection timing setting part 254 according to the present embodiment. Here, in the flowchart, E represents a light projection sensor unit number, R represents a light receiving sensor unit number, and N represents the number of sensor units 100. Further, T represents a delay time (μs), X represents a variable for monitoring whether there is a sensor unit 100 for which the same delay time is set, and Tp represents a light projection period (μs).

First, the light projection timing setting part 254 sets E=0, R=0, T=0 (μs), X=0, and Tp=0 (μs) as initial values (S21). Then, the light projection timing setting part 254 increases the value of E in increments of 1 (E=E+1) (S22), and additionally R=0 is set (S23).

Next, the light projection timing setting part 254 increases the value of R (R=R+1) in increments of 1 (S24), and then determines whether the current set of (E, R) is a set of mutually interfering sensor units (S25). When it is determined that the current set of (E, R) is a set of mutually interfering sensor units (YES in S25), the light projection timing setting part 254 determines whether a delay time set for the $E^{th}$ sensor unit 100 and a delay time set for the $R^{th}$ sensor unit 100 are the same (S26). Here, while initial values of delay times set for each of the sensor units 100 are the same at zero, in S29 to be described below, they are updated to the value of T at that time as needed. On the other hand, when it is determined that the current set of (E, R) is not a set of mutually interfering sensor units (NO in S25), the process advances to S30.

When it is determined that delay times are the same in S26 (YES in S26), the light projection timing setting part 254 determines whether X is equal to E (S27). On the other hand, when it is determined that delay times are not the same (NO in S26), the process advances to S24.

When it is determined that X is not equal to E in S27 (NO in S27), the value of T increases in increments of 10 (T=T+10), the current value of E is assigned as X=E (S28), and then the process advances to S29. On the other hand, when it is determined in S27 that X is equal to E (YES in S27), the process directly advances to S29.

In S29, the light projection timing setting part 254 sets a delay time of the $R^{th}$ sensor unit as T (S29). Then, the light projection timing setting part 254 determines whether R is equal to N (S30). When it is determined that R is equal to N (YES in S30), the light projection timing setting part 254 determines whether E is equal to N (S31). When it is determined that R is not equal to N in S30 (NO in S30), the process advances to S24, and the processes of S24 to S31 are performed again. In addition, when it is determined that E is not equal to N in S31 (NO in S31), the process advances to S22, and the processes of S22 to S31 are performed again.

When it is determined in S31 that E is equal to N (YES in S31), the light projection timing setting part 254 updates the value of Tp as Tp=(T+10) (S32), and the series of processes end.

According to the above processes, the light projection timing setting part 254 can set delay times for periodic light projection timings of the N sensor units 100 based on the light projection control results received from the light projection control part 252 and the detection results received from the sensor units 100.

(Differences from Conventional Example)

Figure 9:
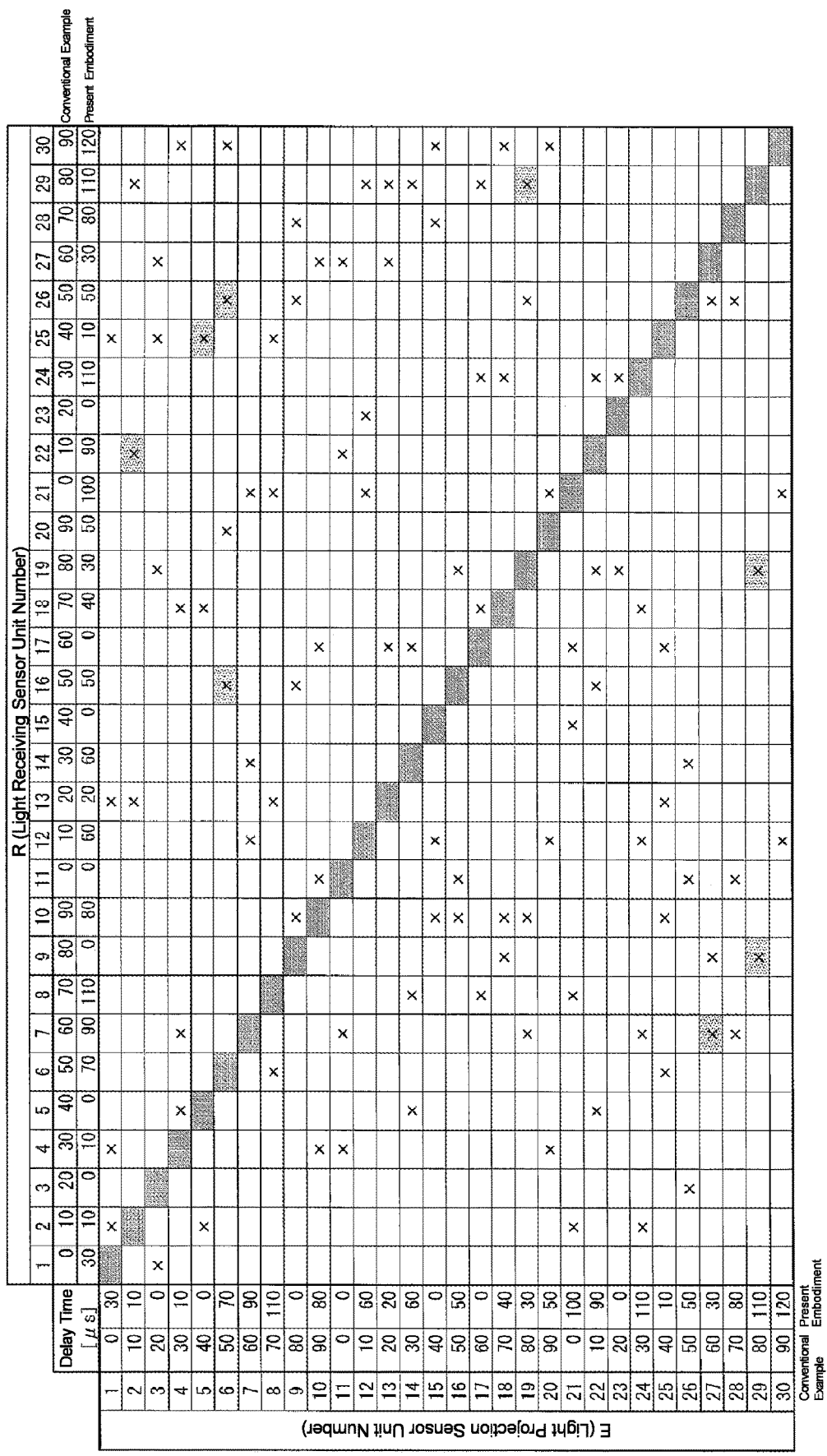
FIG. 9 is a table showing differences in results between a conventional example and the sensor system according to Embodiment 1 of the disclosure when delay times are set for light projection timings of 30 sensor units.
Figures 10A, 10B:
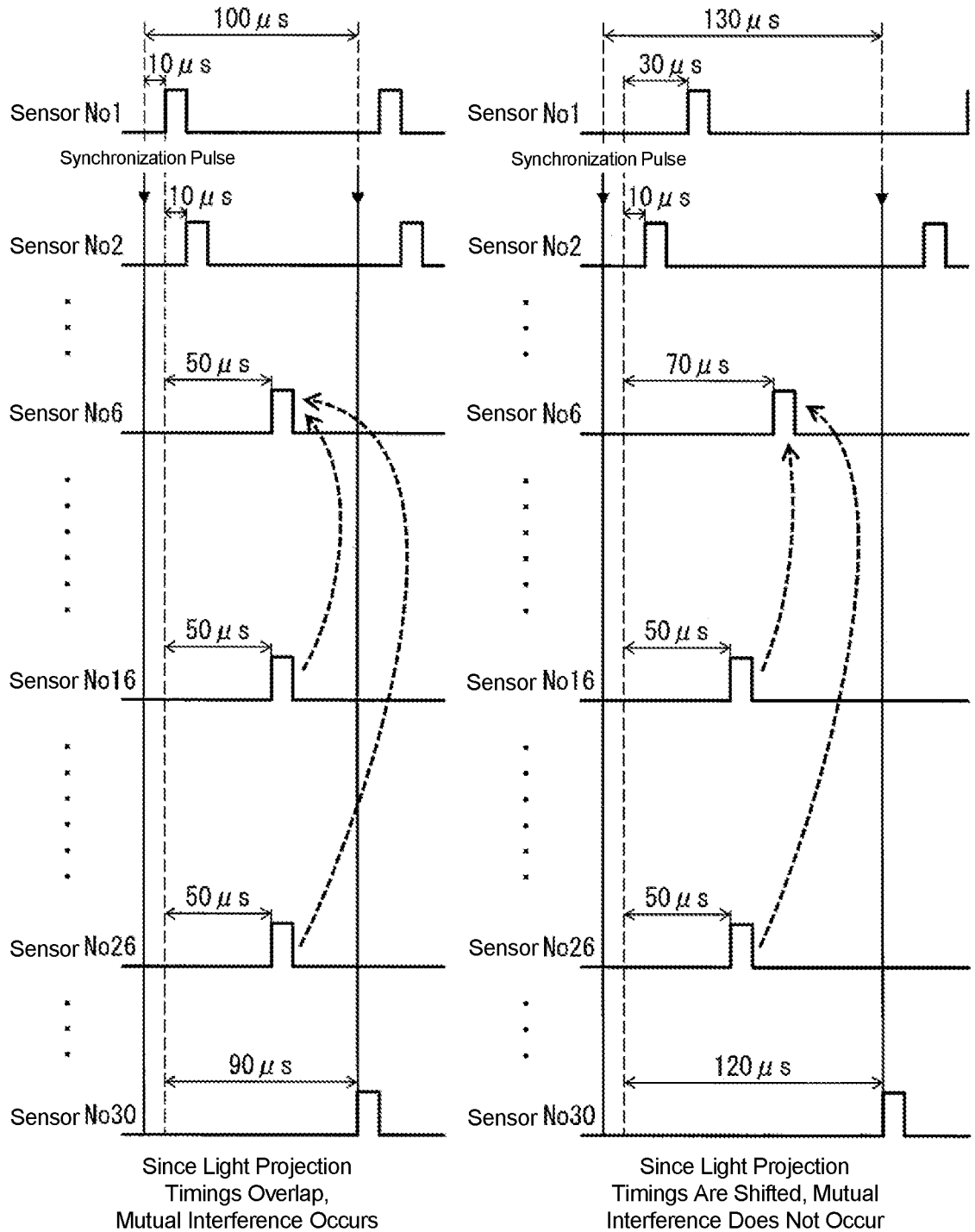
FIGS. 10(a) and 10(b) show waveform diagrams showing differences between the present embodiment and a conventional example when 30 sensor units operate based on the table in FIG. 9 in the sensor system according to Embodiment 1 of the disclosure.

In the present embodiment, differences between the present embodiment and a conventional example will be described based on results in which the light projection timing setting part 254 sets delay times for periodic light projection timings of the plurality of sensor units 100 with reference to FIG. 9 and FIGS. 10(a) and 10(b). FIG. 9 is a table showing differences in results between a conventional example and the sensor system 1 according to the present embodiment when delay times are set for light projection timings of 30 sensor units 100. FIGS. 10(a) and 10(b) show waveform diagrams showing differences between the present embodiment and the conventional example when 30 sensor units operate based on the table in FIG. 9.

Here, in the conventional example, the entire light projection period of the plurality of sensor units 100 is fixed at 100 μs, their delay times are set in intervals of 10 μs, and a maximum of 10 types can be set for the periodic light projection timing. That is, in the sensor system 1 in which 30 sensor units 100 are connected in series, in the conventional example, delay times can be set so that mutual interference is prevented for the tenth sensor unit 100, but it is not guaranteed that mutual interference can be prevented for $11^{th}$ and subsequent sensor units 100.

In the shown example, delay times set for 30 sensor units 100 using the delay time setting process described with reference to FIG. 8 are shown in the lower row in "delay time (μs)" on the side of "R (light receiving sensor unit number)." On the other hand, delay times set for 30 sensor units 100 in the conventional example are shown in the upper row in "delay time (μs)" on the side of "R (light receiving sensor unit number)."

In FIG. 9, regarding shaded parts indicated by "x," delay times are set such that mutual interference occurs in the conventional example, and mutual interference does not occur in the present embodiment. For example, a case in which a set of (E, R) which is one shaded part is (6, 16) may be considered. In the drawing, in the conventional example, the same delay time (50 μs) is set for the sixth and $16^{th}$ sensor units 100. Therefore, mutual interference continues to occur between the sixth sensor unit 100 and the $16^{th}$ sensor unit 100. On the other hand, a delay time of the sixth sensor unit is 70 μs in the present embodiment, but a delay time of the $16^{th}$ sensor unit is 50 μs. Thus, in the present embodiment, mutual interference between the sixth sensor unit 100 and the $16^{th}$ sensor unit 100 is prevented. In this manner, in the present embodiment, it is possible to prevent mutual interference that could not be prevented in the conventional example. In addition, in FIG. 8, in the present embodiment, a delay time with a maximum of 120 μs is set. That is, there is no upper limit for a value that can be set as a delay time, and thus the entire light projection period of the plurality of sensor units 100 is not a fixed value as in the conventional example.

FIG. 10(a) shows an example in which delay times in the conventional example shown in FIG. 9 are applied for periodic light projection timings of 30 sensor units 100. As described with reference to FIG. 9, in the conventional example, since periodic light projection timings of the sixth, the $16^{th}$, and the $26^{th}$ sensor units overlap, mutual interference between them occurs.

FIG. 10(b) shows an example in which delay times in the present embodiment shown in FIG. 9 are applied for periodic light projection timings of 30 sensor units 100. In the present embodiment, since delay times are set by the way that periodic light projection timings of the sixth, the $16^{th}$, and the $26^{th}$ sensor units are different, mutual interference between them does not occur. Further, in the present embodiment, it can be understood that 130 μs including a synchronization time according to a synchronization pulse is the entire light projection period of 30 sensor units.

Therefore, the sensor system 1 according to the present embodiment can set delay times for periodic light projection timings by the way that mutual interference between all of the sensor units 100 is prevented regardless of the number of connected sensor units 100. For example, when the number of sensor units 100 is large, it is possible to set periodic light projection timings by the way that mutual interference is prevented and at the same time, the entire light projection period is minimized. On the other hand, when the number of sensor units 100 is small, periodic light projection timings can be set by the way that the entire light projection period becomes longer in a range in which the user does not feel uncomfortable. In addition, since a series of processes does not require an operation such as setting by the user, they can be automatically performed. Thus, it is possible to provide the sensor system 1 configured to automatically set appropriate light projection timings for the plurality of sensor units 100.

Embodiment 2

Embodiment 2 of the disclosure will be described with reference to FIGS. 1, 11, 12(a) and 12(b).

(Configuration of Sensor System)

A configuration of the sensor system 1 according to the present embodiment will be described with reference to FIG. 1. A basic configuration of the sensor system 1 is the same as that in Embodiment 1 except that some functions of the light projection control part 252 are different. The light projection control part 252 in the present embodiment is different from that in Embodiment 1 in that the entire light projection period of the sensor units 100 that are serially connected to the communication unit 200 can be arbitrarily set in a range in which mutual interference does not occur. Here, the light projection control part 252 may set any light projection period. For example, the shortest light projection period may be set in a range in which mutual interference does not occur in order to improve a response speed of the sensor system 1 or setting may be performed by the way that a light projection period of ambient light that is periodically projected such as LED illumination is avoided and an influence of the ambient light is prevented.

(Differences from Conventional Example)

Figure 11:
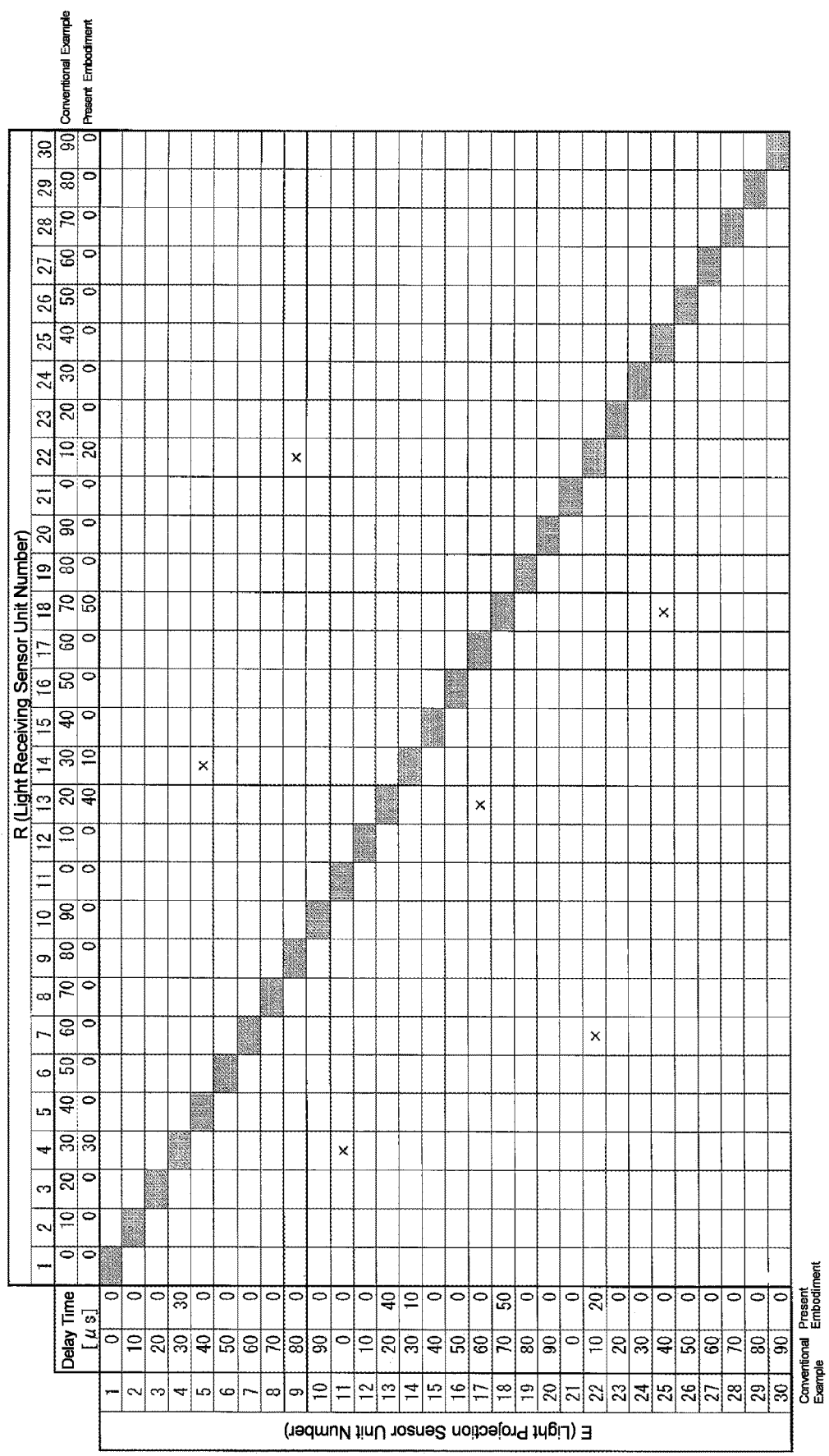
FIG. 11 is a table showing differences in results between a conventional example and a sensor system according to Embodiment 2 of the disclosure when delay times are set for light projection timings of 30 sensor units.
Figure 12A:
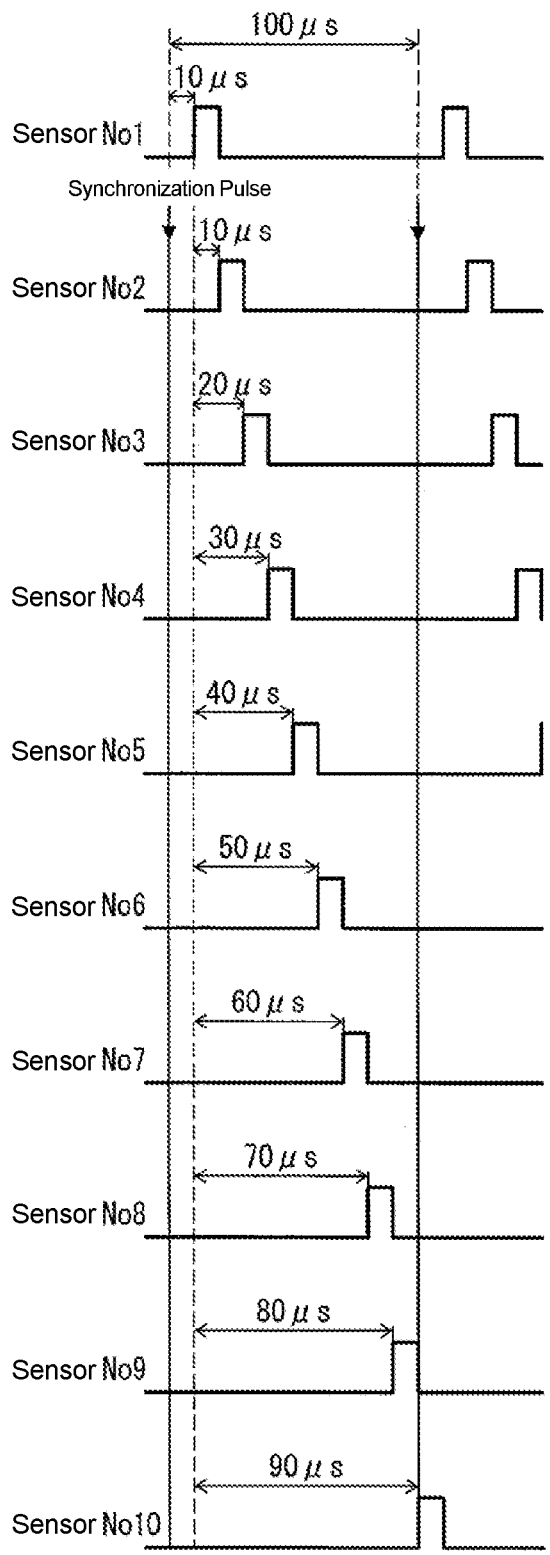
FIGS. 12(a) and 12(b) show waveform diagrams of differences between the present embodiment and a conventional example when 30 sensor units operate based on the table in FIG. 11 in the sensor system according to Embodiment 2 of the disclosure.
Figure 12B:
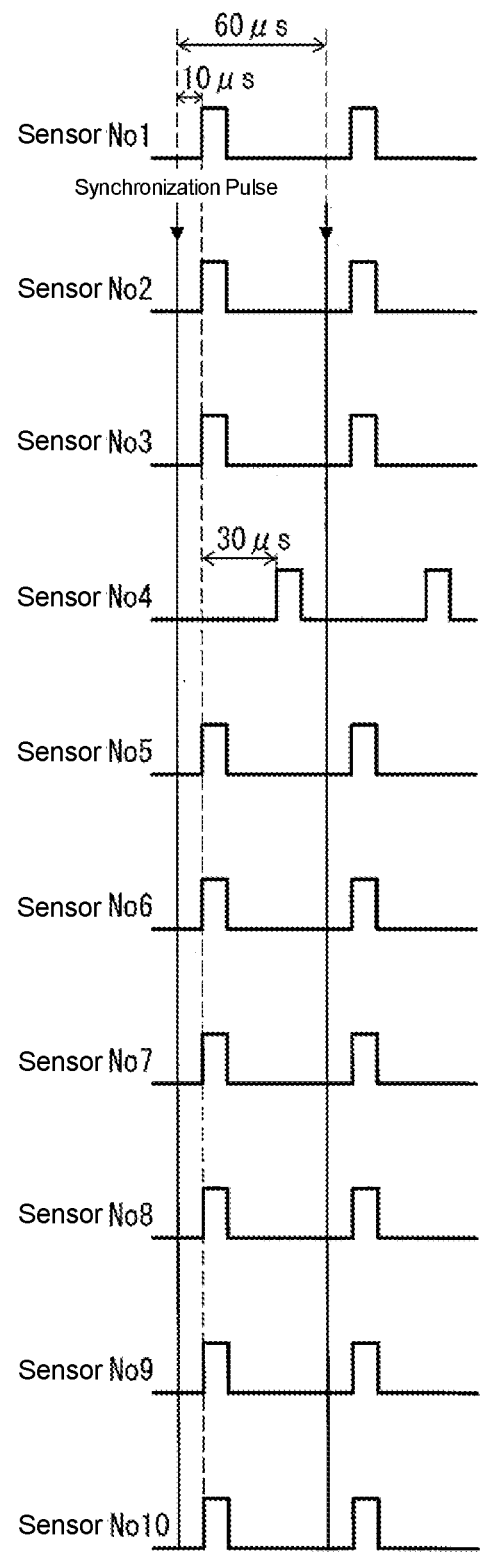
Figure 1:
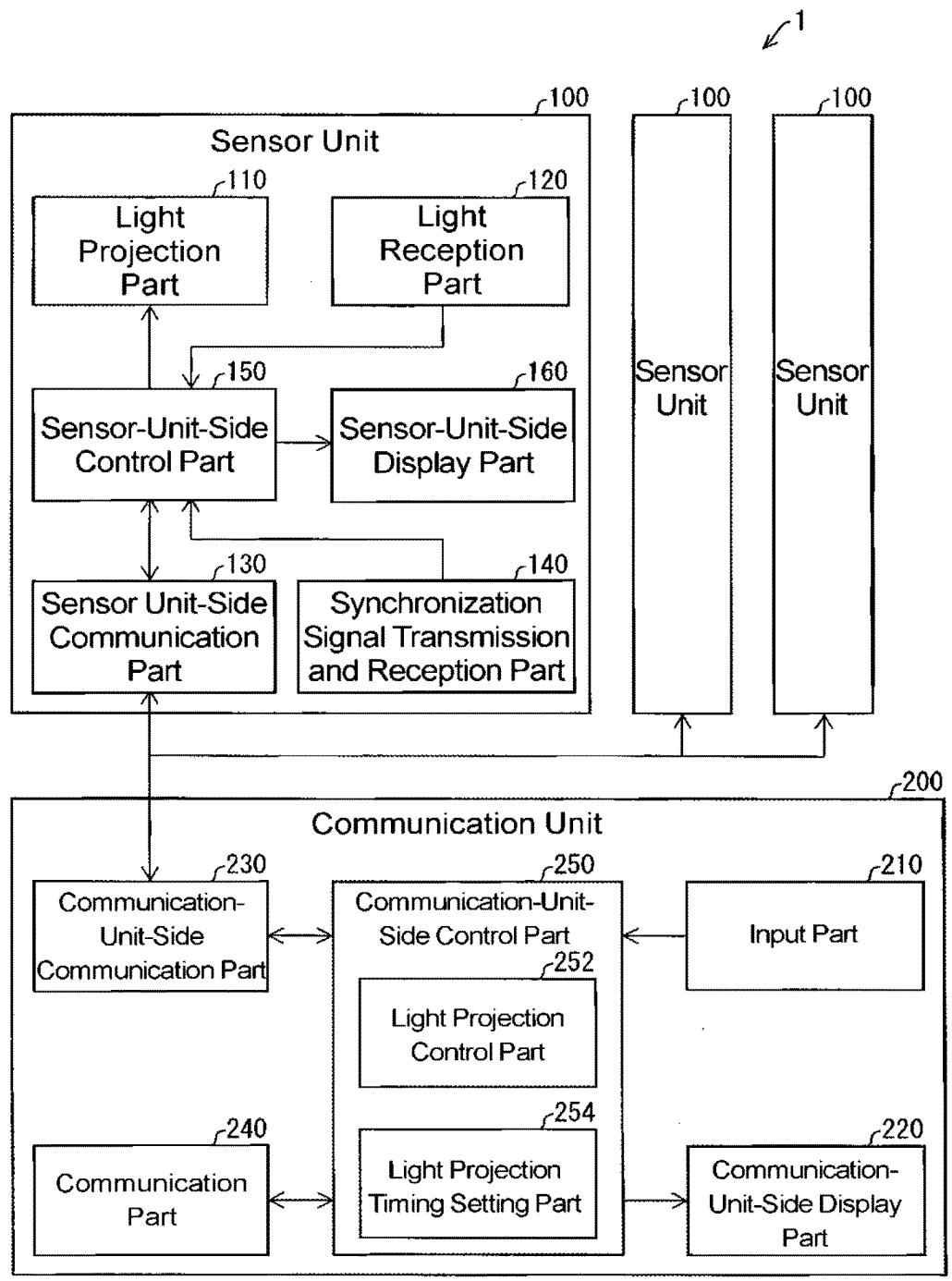

A method in which delay times are set for periodic light projection timings by the way that mutual interference between the sensor units 100 that are serially connected to the communication unit 200 is prevented and additionally setting is performed to shorten the entire light projection period of the sensor units 100 in the sensor system 1 according to the present embodiment will be described with reference to FIG. 11 and FIGS. 12(a) and 12(b). FIG. 11 is a table showing differences in results between a conventional example and a sensor system according to Embodiment 2 of the disclosure when delay times are set for light projection timings of 30 sensor units. FIGS. 12(a) and 12(b) show waveform diagrams of differences between the present embodiment and the conventional example when 30 sensor units operate based on the table in FIG. 11 in the sensor system according to Embodiment 2 of the disclosure.

Here, as in FIG. 9, in the conventional example, the entire light projection period of the plurality of sensor units 100 is fixed at 100 μs, delay times are set in intervals of 10 μs, and a maximum of 10 types can be set for the periodic light projection timing.

FIG. 11 is a table showing detection results of mutual interference acquired in the mutually interfering sensor units detection process described with reference to FIG. 6 in Embodiment 1 and delay times set in the delay time setting process described with reference to FIG. 8 in the same manner as in FIG. 9. In the shown example, there is a difference in delay time setting details between the present embodiment and the conventional example. However, mutual interference does not occur in either of the present embodiment or the conventional example.

FIG. 12(a) shows waveform diagrams when 30 sensor units 100 operate based on delay time details in the conventional example in FIG. 11. In the shown example, the entire light projection period of the first to tenth sensor units 100 is fixed at 100 μs. Here, although not shown, the entire light projection period of the 30 sensor units 100 including the $11^{th}$ to $30^{th}$ sensor units 100 is fixed at 100 μs.

FIG. 12(b) shows waveform diagrams when 30 sensor units 100 operate based on delay time details in the present embodiment in FIG. 11. In the shown example, in the first to tenth sensor units 100, a delay time (30 μs) is set only for the fourth sensor unit 100. In addition, considering the $11^{th}$ to $30^{th}$ sensor units 100 (not shown), a maximum delay time (50 μs) is set for the $18^{th}$ sensor unit 100. In this case, in the present embodiment, 60 μs obtained by adding 10 μs used for synchronization according to a synchronization pulse to 50 µs (maximum delay time) is set as the entire light projection period of the 30 sensor units 100. Thus, since this is shorter than a light projection period (100 µs) in the conventional example, it is possible to improve a response speed of the sensor system 1.

Thus, the sensor system 1 according to the present embodiment can arbitrarily set the entire light projection period of the plurality of sensor units 100 in a range in which mutual interference does not occur. Therefore, for example, it is possible to improve a response speed and prevent an influence of periodic ambient light.

Embodiment 3

Embodiment 3 of the disclosure will be described below with reference to FIG. 1. In the present embodiment, a basic configuration of the sensor system 1 is the same as that in Embodiment 1 except that some functions of the light projection timing setting part 254 are different.

The light projection timing setting part 254 is different from that in Embodiment 1 in that a delay time is set as an appropriate value corresponding to the situation rather than a fixed value. For example, regarding a set of (E, R) in which mutual interference occurs, the light projection timing setting part 254 may set a delay time that is larger than an ordinary delay time for the periodic light projection timing of the $R^{th}$ sensor unit 100 when a light intensity of light received by the light reception part 120 of the $R^{th}$ sensor unit 100 which is projected from the $E^{th}$ sensor unit 100 is excessive. Here, a value set as the delay time may be set according to any method. For example, a binary search method may be applied to the magnitude of a light intensity, an appropriate value may be obtained, and a delay time may be set. In addition, an appropriate delay time may be set using information other than the light intensity.

The sensor system 1 according to the present embodiment can set an appropriate value as a delay time corresponding to the situation. Therefore, for example, when mutual interference occurs, a delay time of the sensor unit 100 that has received an excessive light intensity can be set to be a large value and mutual interference can be prevented more efficiently.

Embodiment 4

Embodiment 4 of the disclosure will be described below with reference to FIG. 1. In the present embodiment, a basic configuration of the sensor system 1 is the same as that in Embodiment 1 except that the plurality of sensor units 100 include a plurality of sensor units of different types. In this case, regardless of the type of the sensor unit, the light projection control part 252 can acquire results of light projection control for all of the sensor units 100 serially connected to the communication unit 200. In addition, regardless of the type of the sensor unit, the light projection timing setting part 254 can acquire results of mutual interference detection for all of the sensor units 100 serially connected to the communication unit 200 and can set delay times for periodic light projection timings according to the light projection control results and the detection results. Here, a delay time set for the periodic light projection timing that is set by the light projection timing setting part 254 may be any value as long as it is possible to prevent mutual interference. For example, a configuration in which different delay times are set based on the type of the sensor unit may be used.

The sensor system 1 according to the present embodiment can set delay times for periodic light projection timings for the plurality of sensor units 100 including different types of sensor units by the way that mutual interference does not occur. Therefore, it is possible to prevent the occurrence of mutual interference between different types of sensor units. For example, different periodic light projection timings can be set for a sensor unit for which mutual interference can be prevented by merely setting slightly different light projection timings and a sensor unit for which mutual interference cannot be prevented unless the light projection timing is significantly different.

Modified Examples

In Embodiment 3, the light projection timing setting part 254 has a configuration in which, when mutual interference occurs, a periodic light projection timing is set according to a light intensity of light received by the light reception part 120. Alternatively, the light projection timing setting part 254 may have a configuration in which a periodic light projection timing is set according to a factor other than the light intensity. For example, in the plurality of sensor units 100, periodic light projection timings may be set according to wavelengths of light projected from the sensor units 100. That is, regarding the set of (E, R) in which mutual interference occurs, when wavelengths of light projected from the $E^{th}$ sensor unit 100 are significantly different from wavelengths of light projected from the $R^{th}$ sensor unit 100, it is possible to determine whether there is a peak due to mutual interference based on peaks of wavelengths of light detected in the light reception part 120. Therefore, the light projection timing setting part 254 need not set different periodic light projection timings or may set slightly different periodic light projection timings for such a combination of sensor units 100.

[Example of Realization by Software]

A control block (particularly, the sensor-unit-side control part 150 and the communication-unit-side control part 250) of the sensor unit 100 and the communication unit 200 may be realized by a logic circuit (hardware) formed on an integrated circuit (IC chip), and may be realized by software using a central processing unit (CPU).

In the latter case, the sensor unit 100 and the communication unit 200 include a CPU that executes an instruction of a program which is software for implementing functions, a read only memory (ROM) or storage device (these are referred to as "recording media") in which the program and various types of data that can be read by a computer (or a CPU) are recorded, a random access memory (RAM) that opens the program, and the like. Thus, when the computer (or a CPU) reads and executes the program from the recording medium, the object of the disclosure is achieved. As the recording medium, "non-transitory tangible media", for example, a tape, a disk, a card, a semiconductor memory, and a programmable logic circuit can be used. In addition, the program may be supplied to the computer through an arbitrary transmission medium (such as a communication network and broadcast waves) that can transmit the program. Here, in an aspect of the disclosure, the program may be realized in the form of a data signal combined with carrier waves embodied according to electronic transmission.

The disclosure is not limited to the above embodiments, and various modifications can be made within the scope of the claims, and embodiments obtained by appropriately combining technical methods disclosed in different embodiments are included in the technical scope of the disclosure.

SUMMARY

The sensor control device (the communication unit 200) according to Aspect 1 of the disclosure includes the light projection control part (252) configured to instruct a light projection operation performed by the light projection part for each of the plurality of sensor units (100) including the light projection part (110) and the light reception part (120), and the light projection timing setting part (254) configured to set periodic light projection timings when each of the sensor units is periodically operated based on results of light projection control performed by the light projection control parts with respect to each of the sensor units and detection results obtained by the light reception part of each of the sensor units.

According to the above configuration, it is possible to set periodic light projection timings based on light projection control results and detection results for the plurality of sensor units. Therefore, for example, it is possible to set light projection timings for the plurality of sensor units by the way that light projection timings do not overlap. Thus, it is possible to provide a sensor control device that automatically sets appropriate light projection timings for the plurality of sensor units.

In the sensor control device (the communication unit 200) according to Aspect 2 of the disclosure, in Aspect 1, the light projection timing setting part (254) may determine whether mutual interference caused when light projected from a certain sensor unit (100) is received by another sensor unit (100) occurs, and may set the periodic light projection timings by the way that mutual interference does not occur.

According to the above configuration, it is possible to set periodic light projection timings by the way that mutual interference does not occur between the light projection sensor units and the light receiving sensor units included in the plurality of sensor units. Therefore, it is possible to prevent an influence of mutual interference during detection of whether a workpiece is present.

In the sensor control device (the communication unit 200) according to Aspect 3 of the disclosure, in Aspect 2, the light projection control part (252) may detect the number of the plurality of sensor units (100), and the light projection timing setting part (254) may set the periodic light projection timings corresponding to the number in a range in which mutual interference does not occur.

According to the above configuration, it is possible to prevent mutual interference and it is possible for the plurality of sensor units to project light at periodic light projection timings corresponding to the number of sensor units. Therefore, for example, when the number of sensor units is large, it is possible to set periodic light projection timings by the way that the entire light projection period is minimized. On the other hand, when the number of sensor units is small, periodic light projection timings can be set by the way that the entire light projection period becomes longer in a range in which the user does not feel uncomfortable. Therefore, it is possible to set appropriate periodic light projection timings according to the number of sensor units.

In the sensor control device (the communication unit 200) according to Aspect 4 of the disclosure, in Aspect 3, the light projection control part (252) may arbitrarily set the entire light projection period of the plurality of sensor units in a range in which mutual interference does not occur.

According to the above configuration, it is possible to arbitrarily set light projection periods in the range in which mutual interference does not occur. Therefore, for example, the shortest light projection period can be set in a range in which mutual interference does not occur in order to improve a response speed of the sensor system.

In the sensor control device (the communication unit 200) according to Aspect 5 of the disclosure, in any one of Aspects 2 to 4, the light projection timing setting part (254) may set the periodic light projection timing based on the situation of the sensor unit (100) when mutual interference occurs.

According to the above configuration, the light projection timing setting part can set a delay time as an appropriate value corresponding to the situation rather than a fixed value. Therefore, for example, it is possible to set a delay time of the sensor unit that has received an excessive light intensity when mutual interference occurs to be large, and it is possible to prevent mutual interference more efficiently.

In the sensor control device (the communication unit 200) according to Aspect 6 of the disclosure, in any one of Aspects 1 to 5, the plurality of sensor units (100) may include sensor units of a plurality of types, and the periodic light projection timing set for each sensor unit may be set based on at least a type of the sensor unit.

According to the above configuration, it is possible to set appropriate periodic light projection timings according to characteristics of each sensor unit. Therefore, for example, different periodic light projection timings can be set for a sensor unit for which mutual interference can be prevented by merely setting slightly different light projection timings and a sensor unit for which mutual interference cannot be prevented unless the light projection timing is significantly different.

In the sensor control device (the communication unit 200) according to Aspect 7 of the disclosure, any one of Aspects 1 to 6 may include the communication-unit-side control part (250) that functions as a communication unit that is communicatively connected to the plurality of sensor units and performs an operation instruction for each of the sensor units.

According to the above configuration, the plurality of sensor units can be controlled by an operation instruction from the communication unit. Therefore, for example, periodic light projection timings set for the sensor unit are stored in the communication unit, and the sensor units can perform light projection at the periodic light projection timings based on the operation instruction from the communication unit. Therefore, it is possible to realize sensor units with a simple configuration.

In the sensor system 1 according to Aspect 8 of the disclosure, any one of Aspects 1 to 6 may include a sensor control device (the communication unit 200) that functions as the communication unit (200) and at least one sensor unit (100).

According to the above configuration, the same operations and effects as in the sensor control device according to any one of Aspects 1 to 6 of the disclosure are obtained.

What is claimed is:

1. A sensor control device comprising:
 a light projection controller configured to instruct a light projection operation performed by a light projection part for each of a plurality of sensor units including the light projection part and a light reception part; and
 a light projection timer configured to obtain combinations of the sensor units in which mutual interference caused when light projected from a certain sensor unit is received by another sensor unit occurs among the plurality of sensor units based on results of light projection control performed by the light projection controller with respect to each of the sensor units and detection results obtained by the light reception part of each of the sensor units, wherein the light projection timer sets different delay times for the sensor units in each of the combinations by the way that mutual interference does not occur, thereby setting periodic light projection timings to each of the sensor units when each of the sensor units is periodically operated.

2. The sensor control device according to claim 1, wherein the light projection controller detects a number of the plurality of sensor units, and wherein the light projection timer sets the periodic light projection timings corresponding to the number in a range in which mutual interference does not occur.

3. The sensor control device according to claim 2, wherein the light projection controller arbitrarily sets an entire light projection period of the plurality of sensor units in the range in which mutual interference does not occur.

4. The sensor control device according to claim 1, wherein the light projection timer sets the periodic light projection timing based on a situation of the sensor unit when mutual interference occurs.

5. The sensor control device according to claim 1, wherein the plurality of sensor units include sensor units of a plurality of types, and wherein the periodic light projection timing set for each of the sensor units is set based on at least a type of the sensor unit.

6. The sensor control device according to claim 1, comprising a communication-unit-side controller that functions as a sensor controller that is communicatively connected to the plurality of sensor units and performs an operation instruction for each of the sensor units.

7. A sensor system comprising:

the plurality of sensor units including the light projection part and the light reception part; and the sensor control device according to claim 6.

* * * * *

UNITED STATES PATENT AND TRADEMARK OFFICE
CERTIFICATE OF CORRECTION

PATENT NO. : 10,705,248 B2
APPLICATION NO. : 15/818766
DATED : November 21, 2017
INVENTOR(S) : Takuya Matsushima et al.

Page 1 of 2

It is certified that error appears in the above-identified patent and that said Letters Patent is hereby corrected as shown below:

In the Drawings

In FIG. 1, reference 240, replace "Present Embodiment" with --Communication Part--.

Delete the current Drawing sheet 1 figure 1, and Replace it with the added new sheet 1 figure 1.

Signed and Sealed this
Nineteenth Day of January, 2021

Andrei Iancu
*Director of the United States Patent and Trademark Office*